May 7, 1963
E. W. ZIMMERMAN
3,088,390
DOUBLE EXPOSURE FILM SHIELD FOR CAMERAS
Filed June 14, 1961
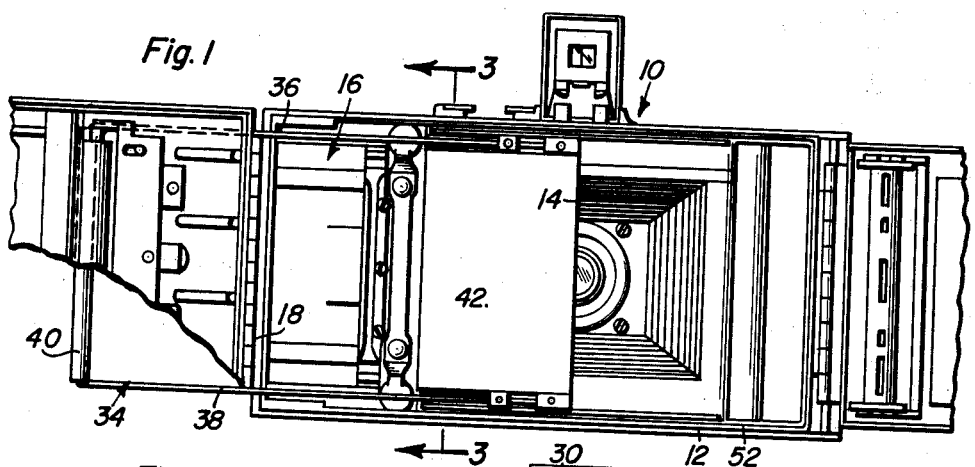
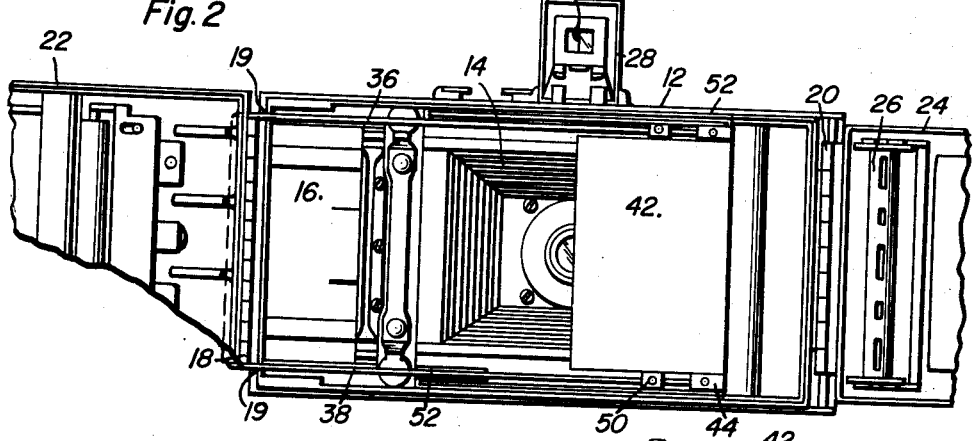
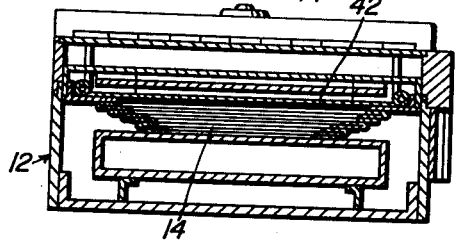
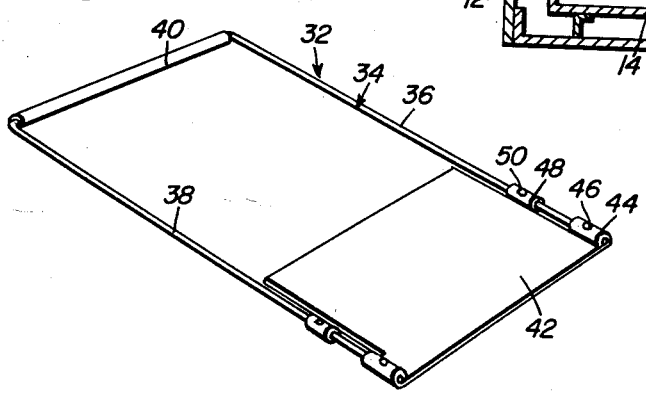
Ervin W. Zimmerman
INVENTOR.

United States Patent Office 3,088,390
Patented May 7, 1963

3,088,390
DOUBLE EXPOSURE FILM SHIELD FOR CAMERAS
Ervin W. Zimmerman, Houtzdale, Pa.
Filed June 14, 1961, Ser. No. 117,005
5 Claims. (Cl. 95—36)

This invention relates to an attachment for cameras whereby the number of separate exposures of the film may be doubled by providing two exposures on each film frame.

Although double exposure film shields have heretofore been used in connection with cameras, the device of the present invention is unique in that no stops or guides need be added to the cameras to which the attachment of the present invention is applicable.

Furthermore, the attachment of the present invention may be easily installed and removed from the camera and also is accurately adjustable to obtain equal size exposures on each film frame.

Another object of this invention is to provide a manually controlled double exposure film shield device for cameras utilizing roll type film by slidable positioning of the shield device between the hingedly connected camera sections. The double exposure shield device is particularly useful in connection with cameras of the type having film development facilities in the rear section thereof. In this type of camera, the rear section includes parts hingedly connected to the front section of the camera case within which the exposure opening is located. Accordingly, when loading the camera with film, installation of the exposure shield device may be made with minimum effort.

An additional object of the present invention is to provide a double exposure shield device which in itself is constructed in such a manner enabling it to be accurately adjusted when installed and disassembled for removal purposes, with minimum effort.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear elevational view of one form of camera with the rear section separated from the front section showing the installation of the novel double exposure shield device of the present invention, the shield device being positioned in one position for locking exposure of one-half of a film frame.

FIGURE 2 is a rear elevational view similar to that of FIGURE 1 but showing the shield device in its other position blocking the other half of the film frame.

FIGURE 3 is a sectional view taken substantially through section line 3—3 of FIGURE 1 but showing the camera in closed condition.

FIGURE 4 is a perspective view of the shield device itself.

Referring now to the drawing in detail, there is shown a camera generally referred to by reference numeral 10 which is of a commercial type which includes facilities for development of film within the camera itself. The camera 10 includes therefore a front section generally referred to by reference numeral 12 having the exposure opening 14 on top of which film is disposed. The front case 12 therefore includes a roll film compartment 16 and is hingedly connected by hinges 18 and 20 to rear sections 22 and 24 of the camera 10 that includes mechanism for handling the film including for example the film spool 26 mounted within section 24. The sections 22 and 24 after loading of the film within the camera, may be closed on top of the front section 12, as indicated in FIGURE 3 after which the camera may be operated in a manner well known to those skilled in the art. Accordingly, the camera is provided on the top side thereof with a viewing device 28 of conventional design that may however be provided with a hairline 30 enabling one to center an object within one-half of the film frame.

Referring now to FIGURE 4 in particular, the double exposure film shield device generally referred to by reference numeral 32 is shown. The shield device 32 includes a wire frame generally referred to by reference numeral 34 which includes two parallel side portions 36 and 38 interconnected at one end by a handle member 40. The other end of the side portions 36 and 38 mounts therebetween, the shield member 42. The shield member is therefore provided with a pair of sleeve formations 44 which receive the ends of the wire frame side portions 36 and 38. The sleeve formations 44 therefore removably mount the shield member 42 on the frame portions 36 and 38 by means of setscrew elements 46. Mounted alongside of the shield member 42 on both wire portions 36 and 38, are stop sleeve members 48 adjustably positioned by means of setscrew element 50.

Referring once again to FIGURES 1 and 2, it will be observed that the film shield member 42 is slidably mounted on the rim portion 52 of the front case 12 of the camera without any guide structure added by virtue of the mounting of the shield member 42 on the side portions 36 and 38 of the wire frame 34. The wire frame side portions are therefore slidably received between the front and rear sections of the camera in carefully cut grooves 19 straddling the hinge 18. The shield member 42 is thereby disposed within the camera and slidable from the position illustrated in FIGURE 1 to the position illustrated in FIGURE 2 in order to expose first one-half and then the other half of the film to the exposure opening 14. The wire frame 34 at the handle end thereof projects outwardly from one side of the camera enabling the operator to manually shift the frame 34 for positioning the shield member 42 within the camera between the positions illustrated in FIGURES 1 and 2.

Any suitable structure such as the stop formation 52 may be taken advantage of in order to limit movement of the shield device 32 to the indicated position in FIGURES 1 and 2. Accordingly, depending upon the camera structure, the adjustable stop sleeve element 52 may be accurately positioned along the wire frame portions 36 and 38 so that when the shield member 42 is in the position illustrated in FIGURE 1, the stop member 50 will abut against the stop formation 52 on the camera case. The other position of the shield member 42 as illustrated in FIGURE 2, will be determined when the handle member 40 abuts against the hinge 18 on the outside of the camera. Accordingly, it will be apparent that accurate positioning of the shield member is made possible without any modification of the camera.

From the foregoing description, the use and application of the shield device of the present invention will be apparent. Although the shield device was described in connection with one particular form of camera, it will be appreciated that it is also applicable to other types of cameras. It will be further apparent, that the device 32 may readily be disassembled for both installation and removal from the camera device by merely loosening of the setscrew elements 46 to remove the shield member 42 from the frame may then be slipped out of the camera after the stop sleeve element 48 has similarly been removed from the wire frame portions 36 and 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A double exposure device for roll film cameras having separable sections with an exposure opening in one of the sections comprising, frame means slidably mounted in the camera between sections, handle means connected to the frame means at one end projecting from one side of the camera and limiting movement of the frame means in one direction to a limit position, adjustable stop means mounted on the frame means within the camera for limiting movement thereof in the other direction to another limit position and film shield means adjustably mounted at the other end of the frame means for blocking one half of the exposure opening only when the frame means is in said limit positions.

2. The combination of claim 1, wherein said frame means comprises a wire having elongated parallel side portions slidably received by said one side of the camera, said side portions being interconnected at said one end of the frame means by the handle means.

3. The combination of claim 2, wherein said shield means is disposed between the side portions of the wire and removably connected thereto at said other end of the frame means.

4. The combination of claim 3, wherein the adjustable stop means includes stop sleeves adjustably mounted on the side portions of the wire alongside of the shield means.

5. A double exposure device for roll film cameras having separable sections with an exposure opening in one of the sections comprising, frame means slidably mounted in the camera between the sections, handle means connected to the frame means at one end projecting from one side of the camera and limiting movement of the frame means in one direction to a limit position, adjustable stop means mounted on the frame means within the camera for limiting movement thereof in the other direction to another limit position and film shield means adjustably mounted at the other end of the frame means for blocking one half of the exposure opening only when the frame means is in either one of said limit positions, said frame means comprising a wire having elongated parallel side portions slidably received by said one side of the camera, said side portions being interconnected at said one end of the frame means by the handle means, the adjustable stop means including stop sleeves adjustably mounted on the side portions of the wire alongside of the shield means.

References Cited in the file of this patent

UNITED STATES PATENTS

| 1,510,410 | Menyhart et al. | Sept. 30, 1924 |
| 2,631,510 | Stanks | Mar. 17, 1953 |
| 2,989,907 | Nelson | June 27, 1961 |

FOREIGN PATENTS

| 17,950 | Great Britain | AD 1914 |